Figure 1:
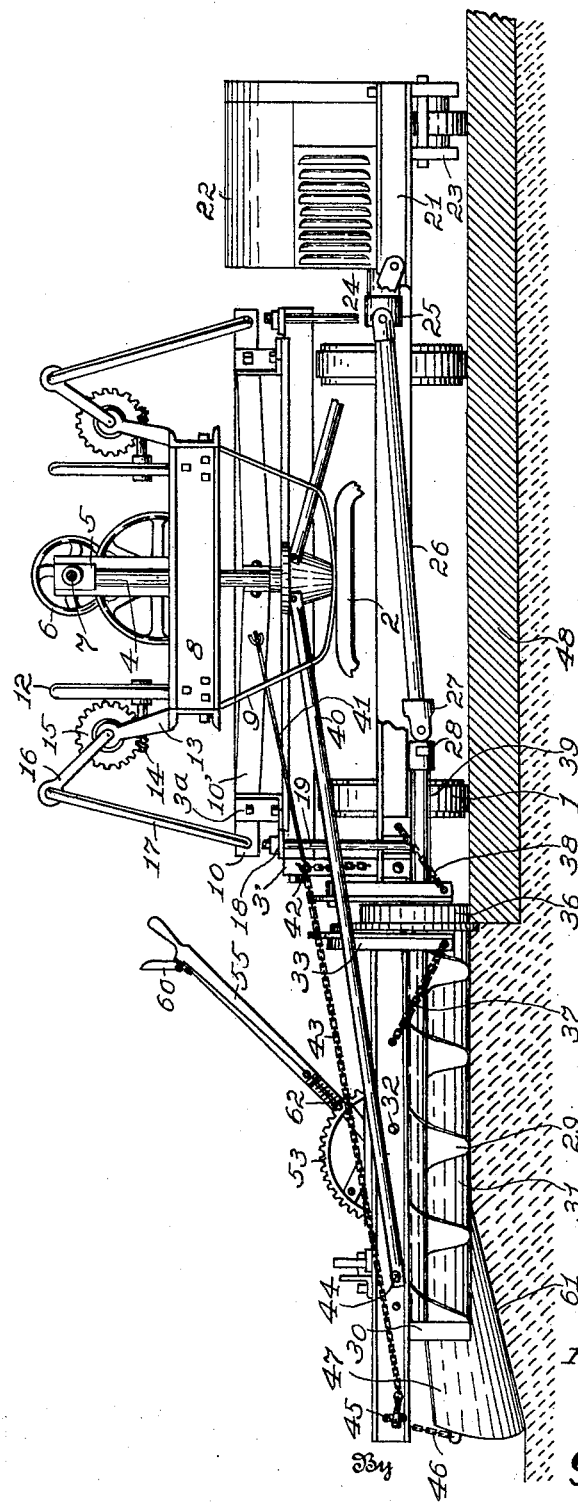

May 23, 1933.  R. T. MOWBRAY  1,910,120
SOIL SHAPING SIDE ATTACHMENT FOR ROAD GRADING APPARATUS
Filed Aug. 13, 1930  3 Sheets-Sheet 1

Inventor
R. T. Mowbray,

May 23, 1933.  R. T. MOWBRAY  1,910,120
SOIL SHAPING SIDE ATTACHMENT FOR ROAD GRADING APPARATUS
Filed Aug. 13, 1930   3 Sheets-Sheet 2
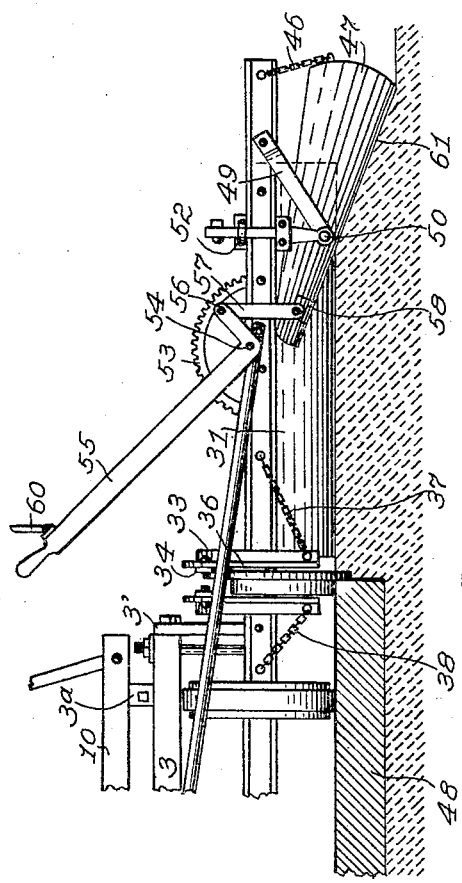
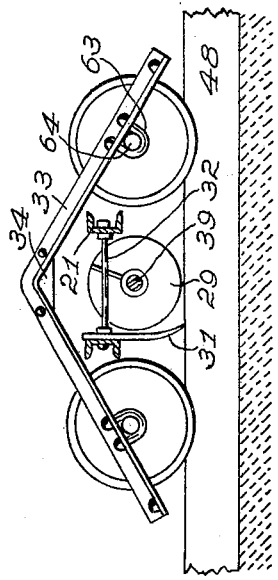
Inventor
R. T. Mowbray,
By G. C. Kennedy,
Attorney May 23, 1933.　　　R. T. MOWBRAY　　　1,910,120
SOIL SHAPING SIDE ATTACHMENT FOR ROAD GRADING APPARATUS
Filed Aug. 13, 1930　　　3 Sheets-Sheet 3
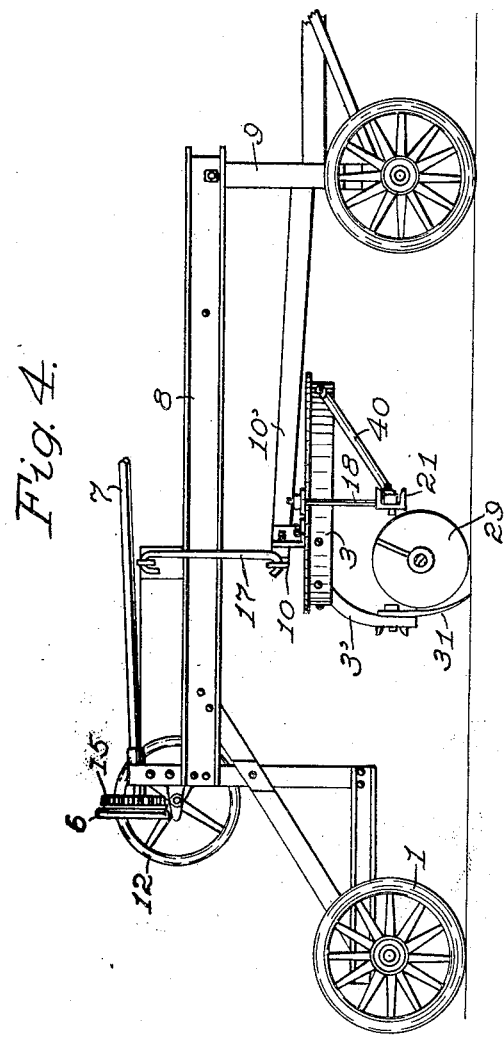
Inventor
R. T. Mowbray,
By J. C. Kennedy,
Attorney Patented May 23, 1933

1,910,120

UNITED STATES PATENT OFFICE

ROBERT T. MOWBRAY, OF WATERLOO, IOWA

SOIL SHAPING SIDE ATTACHMENT FOR ROAD GRADING APPARATUS

Application filed August 13, 1930. Serial No. 474,966.

My invention relates to improvements in soil shaping side attachments for road grading apparatus, and the object of my improvements generally is to supply particularly for use in constructing paved highways or the like, a machine of the grader class, modified for particularly treating and shaping soil surfaces beside the paving of a highway, in a convenient and inexpensive manner, saving time and the cost of labor, and perfecting the levels or slopes of such contiguous surfaces.

One object of the invention is to furnish auxiliary apparatus for the above purposes, suitable for convenient substitution and inclusion in any of the well-known types of grader constructions.

Another object is to supply in my said apparatus an endless carrier adjustable and positioned for use alongside a paving body, and having tracking devices to guide the apparatus evenly and undeviatingly in its course relative to the paving.

Another object is to combine with such an endless carrier or conveyer, a backing shield and scraper to cooperate therewith in the smoothly completing of the function of the apparatus immediately adjacent to the paving.

Another object of the invention is to also combine with said conveyer and scraper an additional and terminal adjustable scraper, operating to treat and shape evenly a desired sloping face alongside both the paving and outside of the soil surface treated by the before mentioned auxiliary apparatus.

Another object of the invention is to include a subframe supported by the main frame of the grader adjustably, and projecting terminally at opposite sides thereof transversely, with a motor or other counterweight mounted on one projecting end opposite the grading elements on the other end part of the subframe above mentioned.

It is to be understood that modifications of each of these combinations are covered by the appended claims, and are within the scope of my invention.

In said invention, I have accomplished in actual practise the objects above outlined by the apparatus which is substantially illustrated in the accompanying drawings, which are hereinafter described and claimed, and include Fig. 1, which is a front elevation of a conventional grader mechanism including and equipped with my improved auxiliary grading apparatus, portions of the former being broken away. Fig. 2 is a rear elevation of said auxiliary apparatus as mounted on a portion of the structure of said grader. Fig. 3 is a side elevation of the tracking devices of this invention, parts of the screw conveyer and the scraper blade to its rear, and the subframe being in transverse section. Fig. 4 is a side elevation of a conventional road grader with parts removed, showing my improved shoulder forming attachment device operatively connected therewith.

Referring first to said Fig. 1, and to the conventional grader construction above mentioned, the grader has a main frame 8 having spaced side channel bars connected at front and rear ends, and on which are mounted different mechanisms. The forward part of the main frame 8 is supported on a medially apertured looped hanger bar 9 which rests upon a front axle which has a fixed standard 4 which traverses its aperture, and the standard 4 also traverses a bearing 8' on the rear face of the front cross member of the main frame. The elements 5, 6 and 7 at the rear of the main frame are for steering and other purposes not germane to this invention. The end parts of the axle 2 are broken away and the carrying wheels therefor not shown, these and the rear carrying wheels 1 being such as are usual to road graders, the grader shown being conventional, and my invention consisting of a shaping attachment suspended from said main frame 8. My said attachment therefore includes a spaced pair of like fixedly connected beams 21 which traverse horizontally the space below the main frame 8 transversely to project at both ends therefrom and placed usually intermediate the forward and rear carrying wheels.

Upon one projecting part of the attachment frame or supporting means 21 is fixed a motor device 22, and that part of the frame has a depending tread wheel 23 as a support. The frame 21 has its longitudinal bars rigidly connected by cross-rods 32.

Upon said main frame 8 are fixed arms 13 at each side, apertured to receive rock shafts having terminally eyed cranks 16, with like worm gears 15 secured on said rock shafts. Worm shafts 14 are mounted rotatably on said arms 13 and mesh with said gears, and carry on their inner ends like hand wheels 12 for manual operation of the gearings and rocking of the cranks 16 respectively. The terminal eye of each crank receives the hooked terminal of a hanger rod 17 whose lower end is pivotally connected to the adjacent end of a transverse swinging bar 10, carrying forwardly convergent bracket arms 10' separately hinged on pintles 10a to a sleeve 10b around the standard 4.

Upon opposite parts of the cross-bar 10 are fixed hangers 3a to which the rear ends of the arms 10' are secured. Below the bar 10 is a rockable body 3 which is secured to depend upon the hangers 3a. It will be seen that the forward end of the main frame 8 is supported upon the forward axle 2, the rear part of the main frame 8 being bolstered by means not shown and on a rear axle carrying the rear wheels 1. The body 3 is hung from the ends of the cross-bar 10, which bar is suspended on the depending links 17 from the outer ends of the cranks 16. The sub-frame bars 21 have transversely spaced bearings at 20 to which are connected the lower ends of hanger rods 19 whose upper ends are threaded at 18 and seated for vertical adjustments of the bars 21 in threaded lugs on the opposite parts of the body 3. The opposite end part of said subframe has a medial depending bearing member 30 to seat one end of a rotary shaft 39 carrying outside the grader a laterally extending conveyer of the Archimedean screw type at 29. This conveyer while in operation is above and in contact with the soil surface contiguous to the adjacent side wall of the paving 48. Hanger arms 3' are fixed on opposite sides of the rock-body 3 and their lower ends are fastened to the rear frame bars 21.

The inner end of the shaft 39 is seated in a depending apertured hanger block 28 on the subframe and has a universal-joint connection 27 with one end of an intermediate shaft member 26 which at it opposite end has a like universal-joint connection 25 with the crank-shaft 24, or other operating rotatable shaft of the motor in said housing 22. Each subframe channel bar has a brace connection or rod 40 swingingly connecting it between a bolt 44 and the middle of the rocker body and thereby through the connections 10 and 10' to the main frame 8. As said subframe with its included shaft sections is adjustably tiltably movable transversely of the main frame, it may be hung in a desired vertically adjusted position by links of a chain connection 43, preferably made of a chain secured at its outer parts to an eye 45 on the outer part of the forward channel bar. A hooked end rod 41 is connected to one of the side arms 10' and at the other end adjustably and separably to chain 43 by an end-hook 42 slipped into different links of said chain.

The numeral 31 denotes a forwardly concaved scraper blade rigidly mounted between the channel bars of the subframe 21 immediately to the rear of the screw conveyer 29.

I have shown a pair of guide or tracker wheels 36, flanged at their outer sides only, to ride upon the outer upper angle of a side wall of the paving body 48 to keep the screw conveyer 29 always in proper relation to and alongside of the paving. Referring to said Fig. 3, these wheels have journals 64 seated rotatably in bearings or loops 63 which project downwardly from opposite parts of an angularly upwardly bent like pair of anglebars 33. These angle-bars straddle the subframe 21, and are connected at opposite ends of each of the pair by means of chains 37 and 38 to the side bars of the subframe, to keep the wheels 36 upright to track correctly upon the paving edge. The angular middle part of each bar 33 may be strengthened by means of a cross plate 34 riveted across their members.

Referring to said Fig. 2, the numeral 47 denotes a forwardly transversely concaved scraper blade widened outwardly and having its inner end pivotally or swingingly mounted at 50 on the lower end of a hangar bar 51 which is secured for vertical adjustments in clips as at 52 and below the subframe, and on the swinging rock-arm 49 mounted terminally on the subframe. This scraper 47 projects laterally outwardly beyond the subframe 21 for a distance. The scraper 47 may be tiltingly adjusted and secured by the following means. 53 is a rack sector mounted on the subframe 21, and is releasably engageable with a hand lever 55, by the usual means, such as the detent 62 on a spring controlled rod linked to a finger piece 60 on the lever. The lower end of the lever has an angular crank part at its pivot 54, which is terminally pivoted to a depending link 57 at 56, the lower end of the link being pivoted at 58 to the rear face of the inner part of said scraper 47. A short chain 46 may be connected loosely between the outer end of the scraper 47 and the end of the subframe thereabove, to restrain forward and back deflections of the scraper. The scraper 47 may be adjusted and used to shape the inclined face 61 of the soil surface, beyond the level upper face of the soil in the zone treated by the screw conveyer 29 which delivers outwardly loosened earth retained by the scraper blade 31, as the machine advances. The surfaces are thus quickly evenly formed, with a great saving of time and labor.

It will be understood that means may be supplied within the hood 22 or elsewhere, to reverse the direction of the shaft 39 and screw conveyer to deliver inwardly, or to change the speed of rotation of the shaft.

Having described my invention, what I claim as new, and desire to secure by Letters Patent, is:

1. A shoulder forming attachment adapted to be removably and adjustably vertically suspended from a wheeled grader, and including a laterally projecting beam structure carrying a laterally projecting swingable screw conveyer supported from the grader, an arched frame bridging said conveyer at its inner end adjacent said main frame, flexible supporting means on said attachment for said arched frame, and a pair of flanged tread and guide wheels rotatably mounted on opposite end parts of the arched frame to ride upon the upper edge of the adjacent outer side wall of a paving body.

2. A shoulder forming attachment adapted to be removably and adjustably vertically suspended from a wheeled grader and having a transverse subframe both ends of which project from the grader, a motor supported on one end of said subframe, a screw conveyer whose shaft is mounted rotatably on the opposite part of the subframe to project laterally beyond the grader therewith, and an universal joint connecting means between the conveyer shaft and the motor shaft.

3. A lateral grading attachment adapted to be removably and adjustably vertically suspended from a wheeled grader and having a subframe comprising spaced connected bars supported on the grader frame below it to project at one end laterally therefrom, a screw conveyer mounted between the subframe bars to project downwardly therefrom, a scraper blade mounted along the subframe along one side of the screw conveyer, and means for vertically adjusting the position of the subframe and said screw conveyer.

4. A shoulder forming attachment adapted to be removably supported on a grader mounted on means for transportation, a transverse subframe both ends of which project from the grader having a screw conveyer mounted along one end part of the subframe, a scraper blade mounted along said projecting part of the subframe in the rear of the screw conveyer, an auxiliary scraper blade projecting outwardly from the subframe in the rear of the first mentioned scraper blade and adjustably hinged to the rear of the subframe, and a counterweight motor on the opposite projecting part of the subframe and operatively connected to said screw conveyer.

5. An attachment for a grader having a main frame, comprising a subframe removably connected to the main frame and projecting laterally therefrom and including a beam structure, a guiding device comprising a pair of flanged wheels mounted on a support astride the beam structure and alongside the main frame to tread upon the upper edge of the side wall of a paving body upon which the main frame is moving, a screw conveyer mounted along the beam structure, and an adjustable soil treating member hingedly mounted upon the outer part of the beam structure.

6. A soil-shaping side attachment for a road-grading apparatus mounted for transportation and which has a main-frame, comprising a sub-frame consisting of a beam-structure removably suspended beneath the main-frame to project at both ends therefrom, a counterweight motor mounted on one end of the beam-structure, a soil-treating device mounted on the opposite part of said beam-structure and operatively connected to said motor, and a manually adjustable shoulder-forming device hingedly mounted on said beam-structure to project laterally beyond said soil-treating device.

7. In the apparatus described in said claim 6, and in combination therewith, means for pendantly supporting the free end of the shoulder-forming device adjustably on the outer end of the beam-structure, and rigid means pivoted at the ends thereof to and between the beam-structure outer part which carries said shoulder-forming device and said road-grading apparatus to support said structure.

8. In the apparatus described in said claim 6, and in combination therewith, flanged tracking-wheels loosely supported on said beam-structure for vertical movements and restrained from movements lengthwise of said structure, to track upon an edge angle of paving.

9. In a soil and shoulder shaping attachment for grading apparatus having a main frame, comprising a sub-frame and having a soil cutting and conveying device positioned below the main frame transversely to project laterally therefrom and adjustably removably mounted on the main frame, and a manually actuable movable shoulder-forming blade mounted and supported adjacent the outer end of said cutting and conveying device for adjustably limited movements.

10. In the apparatus of said claim 9, the combination therewith of a pair of tracking wheels supported flexibly to track along the upper angular corner of highway paving.

In testimony whereof I affix my signature.

ROBERT T. MOWBRAY.